United States Patent
Rakijas

(10) Patent No.: US 7,994,982 B2
(45) Date of Patent: Aug. 9, 2011

(54) METHOD AND APPARATUS FOR BOUNDED TIME DELAY ESTIMATION

(75) Inventor: Michael Rakijas, Yorba Linda, CA (US)

(73) Assignee: Raytheon Company, Waltham, MA (US)

( * ) Notice: Subject to any disclaimer, the term of this patent is extended or adjusted under 35 U.S.C. 154(b) by 160 days.

(21) Appl. No.: 12/483,694

(22) Filed: Jun. 12, 2009

(65) Prior Publication Data

US 2010/0315291 A1    Dec. 16, 2010

(51) Int. Cl.
*G01S 3/02* (2006.01)
(52) U.S. Cl. ........................................................ 342/458
(58) Field of Classification Search .................... 342/458
See application file for complete search history.

(56) References Cited

U.S. PATENT DOCUMENTS

| | | |
|---|---|---|
| 6,342,854 B1 | 1/2002 | Duffett-Smith et al. |
| 6,590,537 B2 | 7/2003 | Bay |
| 6,636,744 B1 | 10/2003 | Da |
| 6,671,514 B1 | 12/2003 | Cedervall et al. |
| 6,785,321 B1 * | 8/2004 | Yang et al. .................... 375/137 |
| 7,333,774 B2 | 2/2008 | Banerjee et al. |
| 7,340,259 B2 | 3/2008 | Maloney et al. |
| 7,400,890 B2 | 7/2008 | Lee |
| 2003/0008669 A1 | 1/2003 | Stein et al. |
| 2008/0130794 A1 | 6/2008 | Chong et al. |
| 2009/0041163 A1 * | 2/2009 | Jonsson et al. ................ 375/340 |

FOREIGN PATENT DOCUMENTS

| | | |
|---|---|---|
| EP | 1545023 A1 | 6/2005 |
| WO | 0154422 A2 | 7/2001 |

\* cited by examiner

*Primary Examiner* — Harry Liu
(74) *Attorney, Agent, or Firm* — Lando & Anastasi, LLP

(57) ABSTRACT

A method and apparatus for estimating the position of a mobile device in a multi-path environment. In one example, the method includes receiving a plurality of reference signals from a corresponding plurality of reference devices, for each reference signal, calculating expected time delay boundaries, for each reference signal, estimating a range between the device and the corresponding reference device based on a measured time delay of the reference signal falling within calculated time delay boundaries to produce a plurality of range estimates, and filtering the plurality of range estimates to generate a composite estimate of the position of the device.

22 Claims, 9 Drawing Sheets

METHOD AND APPARATUS FOR BOUNDED TIME DELAY ESTIMATION

BACKGROUND

1. Field of the Invention

The present invention relates generally to the field of wireless communications and, more particularly, to wireless devices having self-locating capability.

2. Discussion of Related Art

Many radios have self localization capabilities, sometimes using global positioning satellite (GPS) systems. However, any radio may be denied access to GPS service due to the environment of usage at a give time. For example, radios used in densely built-up areas or in areas that are in the shadow of buildings, may be unable to receive a GPS signal due to blocking by the buildings or natural terrain.

Some radios also self-locate using radio frequency (RF) signaling to determine their range relative to other radios having known locations. This is done by measuring the time delay of a signal received by one radio from another radio at a known location. Methods of triangulation can be used to determine the location of the radio based on its range to at least three other radios with known locations. However, radios that use RF signaling to deduce range between one another may be susceptible to errors in the range calculation that arise when the radios are in a multi-path environment. Various processing techniques have been applied to the time delay calculation procedure in attempts to smooth motion of the radio through the occasional erroneous range calculation due to multi-path errors. These techniques include, for example, setting minimum thresholds for the received signal power, seeking the earliest arrival signal, and averaging or filtering sequential estimates.

SUMMARY OF INVENTION

As discussed above, although there have been various processing techniques applied to time delay estimation procedures to attempt to compensate for multi-path errors, these yield often unsatisfactory results. Accordingly, aspects and embodiments are directed to systems and methods to provide more robust and accurate self-localization capability for wireless devices operating in a multi-path environment. A time delay estimation process may be used to estimate the range between wireless devices, at least some of which have known locations. Changing positions or motion of at least some of the wireless devices may be tracked or estimated and used to reduce multi-path errors in the time delay estimation process, as discussed below. According to one embodiment, motion/position tracking of the wireless device is linked through feedback to the time delay estimation process, which may limit the improper selection of non-direct path signal estimates, as discussed further below.

One embodiment is directed towards a method of estimating a position of a device. The method may comprises acts of estimating a first time delay of a first reference signal received at the device that was transmitted from a reference device at a first time period, and determining a limited range of values for a second time delay for a second reference signal to be received at the device from the same reference device at a second time period based on at least one known characteristic between the device and the reference device. The method may further comprise receiving the second reference signal, estimating the second time delay by analyzing the second reference signal to determine a delay of the second reference signal falling within the limited range of values for the second time delay, and based on the second time delay, estimating a distance between the device and the reference device.

According to another embodiment, a method of estimating a position of a device comprises receiving a reference signal at the device transmitted from a reference device, determining a range of values for a time delay of the reference signal based on a known relative mobility of the device and the reference device, estimating the time delay by analyzing the reference signal to detect a peak of the reference signal falling within the range of values for the time delay, and based on the estimated time delay, estimating a distance between the device and the reference device. In one example, determining the range of values for the time delay includes calculating the range of values for the time delay based on a known maximum velocity of at least one of the device and the reference device. The method may further comprise receiving at least one additional reference signal from a corresponding at least one additional reference device. For each additional reference signal, the method may include determining an expected range of time delay values, estimating a time delay by analyzing the additional reference signal to detect a peak of the additional reference signal falling with the expected range of time delay values, and based on the estimated time delay, estimating a distance between the device and the corresponding additional reference device. The method may further comprise filtering each of the estimated distances to produce a composite estimate of the position of the device. In one example, determining the range of values of the time delay includes determining the range of values of the time delay based on a prior known position of the device and the known relative mobility of the device and reference device. In another example, determining the range of values of the time delay includes determining the range of values of the time delay based on a known maximum relative displacement between the device and the reference device.

According to another embodiment, a method of estimating a position of a device comprises acts of receiving a plurality of reference signals from a corresponding plurality of reference devices, for each reference signal, determining a range of expected time delay values for the reference signal transmitted by the corresponding reference device, for each reference signal, estimating a range between the device and the corresponding reference device based on a measured time delay of the reference signal falling within the range of expected time delay values to produce a plurality of range estimates, and filtering the plurality of range estimates to generate a composite estimate of the position of the device.

In one example, determining the range of expected time delay values includes determining the range of expected time delay values based on a known maximum displacement of the device relative to the corresponding reference device. This may be obtained through a maximum relative velocity between the device and the reference device and a known time period between successive transmissions of the reference signal from the corresponding reference device. In another example, determining the range of expected time delay values includes determining a minimum expected time delay value and a maximum expected time delay value. The method may further comprise iteratively repeating the method to produce updated composite estimates of the position of the device after each time period. In another example, estimating a range between the device and the corresponding reference device includes analyzing the reference signal to detect a peak in delay of the reference signal falling within the range of expected time delay values.

Another embodiment is directed to computer-readable media having computer-readable signals stored thereon that define instructions that, as a result of being executed by a computer, instruct the computer to perform a method for estimating a position of a device. The computer-readable media may include separate computer-readable media with signals stored thereon for performing each individual element of the methods described above, and/or computer-readable media for performing any or all of the method elements described above in combination.

According to another embodiment, a position estimation apparatus for a mobile device comprises an antenna to receive a plurality of reference signals, each reference signal of the plurality of reference signals being transmitted to the mobile device from one of a corresponding plurality of reference devices, and a range estimation device coupled to the antenna to receive the plurality of reference signals and to estimate a range between the mobile device and each of the corresponding reference devices based on a measured time delay of each of the plurality of reference signals to produce a plurality of range estimates. The apparatus further comprises a filter coupled to the range estimation circuitry and configured to receive and filter the plurality of range estimates and to generate a composite estimate of the position of the device, and a feedback device coupled to the filter and to the range estimation circuitry and configured to receive the composite estimate of the position of the device and to calculate a range of expected time delay values for each of the plurality of reference signals. The range estimation circuitry is further configured to receive the range of expected time delay values from the feedback device and to estimate the range between the device and the corresponding reference device based on the measured time delay of the reference signal falling within the corresponding range of expected time delay values calculated by the feedback device.

The mobile device may be, for example, a radio. In one example, the position estimation apparatus further comprises signal processing apparatus coupled to the antenna that receives and processes the plurality of reference signals to produce a corresponding plurality of processed signals. In this example, the range estimation device is coupled to the signal processing apparatus and receives the plurality of processed signals from the signal processing apparatus. The signal processing circuitry may comprise a digital sampler configured to receive and digitally sample the plurality of reference signals to produce a corresponding plurality of digital signals, and a real or complex correlator coupled to the digital sampler and configured to receive and filter the plurality of digital signals to produce the plurality of processed signals. In one example, the digital sampler comprises an analog-to-digital converter. In another example, the correlator comprises a complex digital filter. The feedback device may be further configured to calculate the range of expected time delay values based on a known time period between successive transmissions of the plurality reference signals by the corresponding plurality of reference devices, and a known mobility of the device relative to each of the plurality of reference devices. The range estimation device may be further configured to analyze the plurality of processed signals and, for each processed signal, to detect a peak of the processed signal and calculate, based on the detected peak, a time delay of the reference signal falling within the corresponding range of expected time delay values calculated by the feedback device.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

Figure 1:
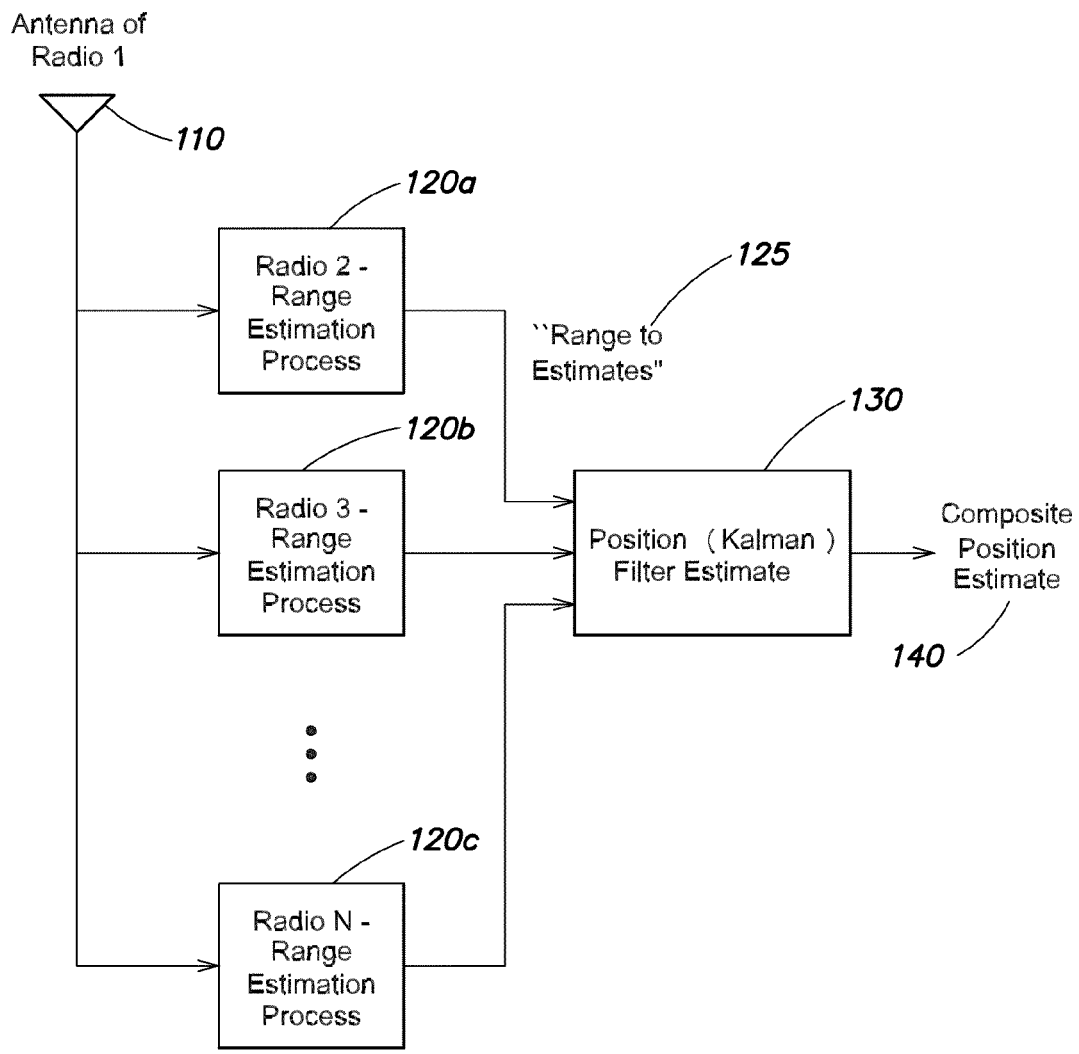
FIG. 1 is a functional block diagram of one example of a position estimation process.

Aspects and embodiments are directed to a bounded time delay estimation concept which can be used to provide improved self-localization and tracking for wireless devices.

For example, radios that need to continue to self locate in the intermittent absence of GPS service may embodiments of the methods and apparatus discussed herein improve their ability to self-locate. Conventional self-location processes generally use a time of arrival estimation process to estimate range to a known reference point, followed by a tracker algorithm to monitor changes in position. By contrast, aspects and embodiments use a tracker to affect the time of arrival range estimation process, thus linking these previously separate sequential processes in a unique way to limit the possibility of an incorrect decision being made, as discussed further below.

It is to be appreciated that embodiments of the methods and apparatus discussed herein are not limited in application to the details of construction and the arrangement of components set forth in the following description or illustrated in the accompanying figures. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, and upper and lower are intended for convenience of description, not to limit the present systems and methods or their components to any one positional or spatial orientation.

Radios can localize one another by measuring the time delay of a known signal sent between the radios. For example, assuming a free space environment, if radio 2 sends a known signal at a known time to radio 1, radio 1 may estimate the propagation time of the that signal, $t_d$, as the time of arrival of the signal, $t_1$, minus the known departure time of the signal, $t_0$. Assume further that radio 1 and radio 2 have established an arbitrary but common time reference. In one example, by prior arrangement, radio 2 sends an agreed upon known signal at:

$$t_0 = 1.538593 \text{ s}$$

The signal arrives at radio 1 at:

$$t_1 = 1.538595 \text{ s}$$

The time of travel (propagation time) of the signal between the two radios may be calculated at radio 1 as:

$$t_d = t_1 - t_0 = 2 \times 10^{-6} \text{ s}$$

Accordingly, assuming a free space environment in which the signal travels at the speed of light, $c = 2.998 \times 10^8$ m/s, then the distance between radio 1 and radio 2, $r_{12}$, can be calculated by radio 1 as:

$$r_1 = c \times t_d = 599.585 \text{ m}$$

If the location of radio 2 is known, for example, through GPS information, survey, or because radio 2 is at a fixed known location, then radio 1 knows it is a distance $r_{12}$ away from the known location of radio 2, which defines a sphere of possible locations of radio 1 in free space.

Radio 1 may repeat this procedure with one or more additional radios. For example, radio 1 may estimate its range to radio 3 which is at its own known location, which would define a second sphere of possible locations of radio 1. Radio 2 and radio 3 are referred to as reference radios, or reference nodes, since their locations are known. Knowing the range from radio 1 to each of these two reference nodes would generally define a circle (the intersection of two spheres), any point of which may be the location of radio 1. The range to an additional reference radio, e.g., radio 4, isolates the location of radio 1 to a point. Those skilled in the art will recognize that there are slight errors in this procedure, largely induced by perturbations in the time of arrival estimation step(s), such that the calculation of the position of radio 1 is typically not perfect.

Thus, radio 1 may establish its position by estimating the time of arrival of signals sent from reference radios. In the example discussed above, the reference radios send known signals to radio 1 at predetermined times. In another example, radio 1 may estimate its position by transmitting known signals to reference radios, receiving return signals, and determining the time taken for the signal to make the round trip. The time delay estimation process may be repeated because the radio positions are not fixed, but instead vary as the user of the radio moves. Therefore, the position estimation procedure is repeated, for example, periodically, in order to generate updates of the estimated position of radio 1. Rather than using only the most recent estimated position of radio 1, better results (e.g., more accurate position estimates) may be achieved by filtering. The motion of radio 1 can generally be assumed to be smooth and methodical, provided that the time interval between successive position estimates is sufficiently small. In other words, the most recent position of radio 1 is a generally smooth function of its position at the previous time the estimation process was performed and its (relatively smooth) motion until the current time of performing the estimate. Accordingly, the estimate of the current position, $p_i$, can be improved by filtering based on the set of previous estimates, $p_1, p_2, p_3, \ldots p_{i-1}$. In one example, the filter is a filter that minimizes the mean square error between the actual position and the estimated position. If the motion of radio 1 is assumed to be smooth, as discussed above, then the filter may be a Kalman filter.

Referring to FIG. 1, there is illustrated a block diagram of one example of this type of position estimation process. Radio 1 includes an antenna 110 that receives a signal from each of the reference radios being used. The receiver of radio 1 performs range estimation processes, based on a time delay estimation using the respective received signal, to estimate its range to each of the reference radios, as indicated by blocks 120a, 120b and 120c. The receiver of radio 1 includes processing circuitry that is configured to perform these range estimation processes to estimate the range from radio 1 to each of the reference radios. The processing circuitry may provide the calculated "range to" estimates 125 to the filter 130 which outputs a composite position estimate 140 for radio 1.

The above-described process is subject to error in a multi-path environment because the signal time of arrival estimation procedure becomes corrupted when multi-path occurs in the propagation of the RF signal from any of the reference radios (e.g., radios 2, 3 and/or 4) and the radio with the unknown position (e.g., radio 1). This problem may be compounded by the filtering process because the assumed relatively smooth motion becomes "jumpy," that is, the radio appears to move dramatically between successive estimations.

Figure 2:
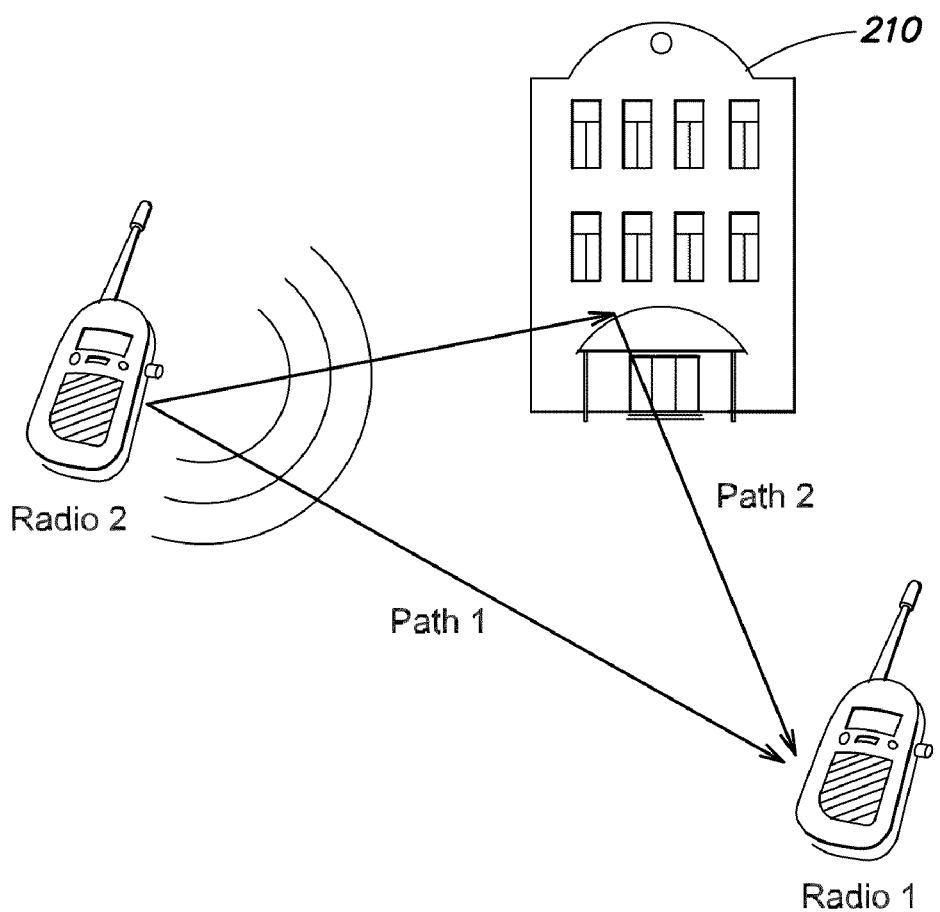
FIG. 2 is a diagram illustrating a multi-path environment.

As discussed above, multi-path occurs because the RF signals are not travelling in free space between the source and destination and may be encountering reflective barriers, such as a building or topographic feature. Referring to FIG. 2, there is illustrated a diagram demonstrating the multi-path effect. A portion of the signal sent by radio 2 will travel on a direct path, path 1, to radio 1. However, another portion of the signal encounters a barrier (building 210) which also reflects the signal to radio 2 (path 2). Thus, the signal received at radio 1 is a combination of two delayed versions of the signal sent by radio 2.

Assume the signal sent by radio 2 is a single cycle sine wave with a frequency, $f_2$, given in samples, of $f_2=100$ samples, and defined by the following equation:

$$s2(x) = \sin\left(2\pi \frac{x}{f_2}\right) \quad (1)$$

Figure 3:
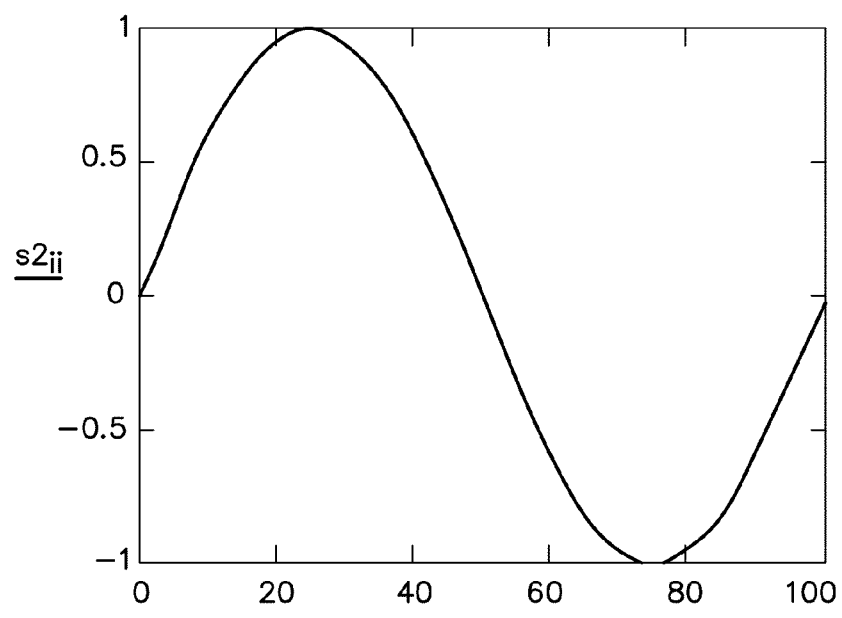
FIG. 3 is a graph illustrating one example of a signal that may be transmitted by a reference radio.

An example of this signal emitted by radio 2 is illustrated graphically in FIG. 3.

In the multi-path environment illustrated in FIG. 2, the signal received by radio 1 is two copies of the original signal delayed by the propagation of the two signal paths (path 1 and path 2). In one example, the signal with the earlier arrival is the signal that travels the shortest (i.e., direct) path (path 1) and the signal that arrives later is the signal that traveled the longer, reflected path (path 2). Mathematically, the two copies of the sent signal combine to yield the received signal with additive noise according to the following equation:

$$s1_{jj} = A1 \cdot s(\min(\max(0, jj-d_1), f_2)) + A2 \cdot s(\min(\max(0, jj-d_2), f_2)) + N \cdot w_{jj} \quad (2)$$

In equation (2), A1 and A2 are the amplitudes of the two copies of the signal, $d_1$ and $d_2$ are the propagation delays for the two signal paths, w is unit variance normally distributed noise, and N is the amplitude of the noise.

Figure 4:
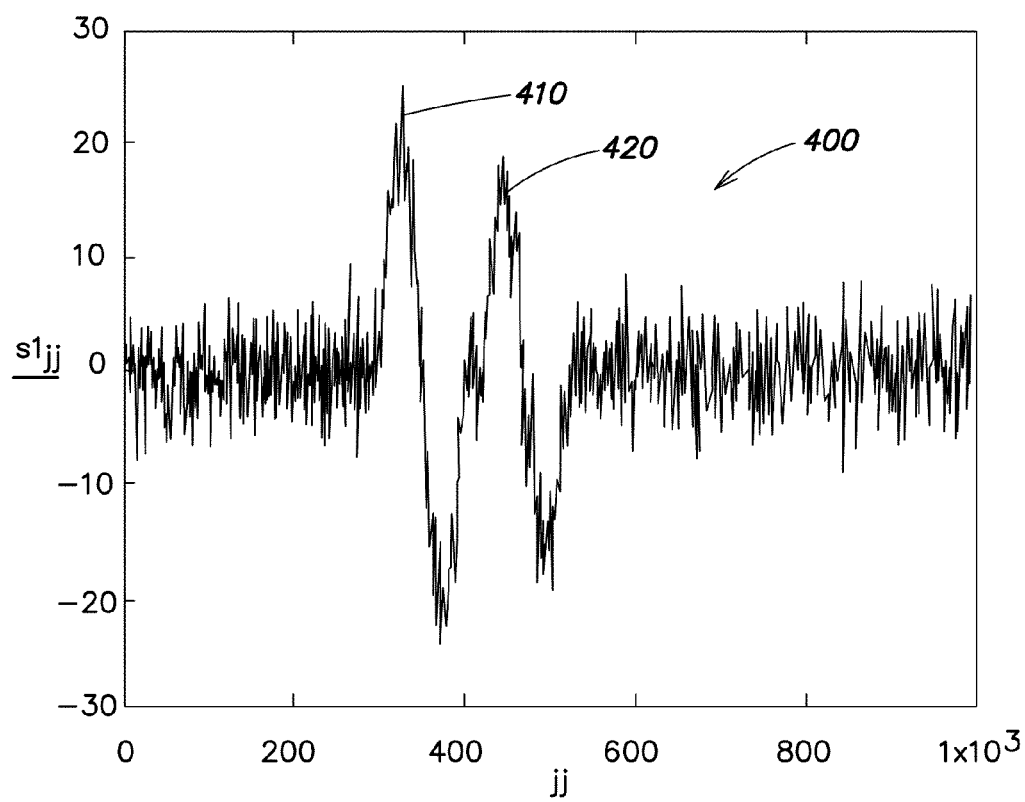
FIG. 4 is a graph illustrating one example of a received signal corresponding to the transmitted signal of FIG. 3 in a multi-path environment.
Figure 5:
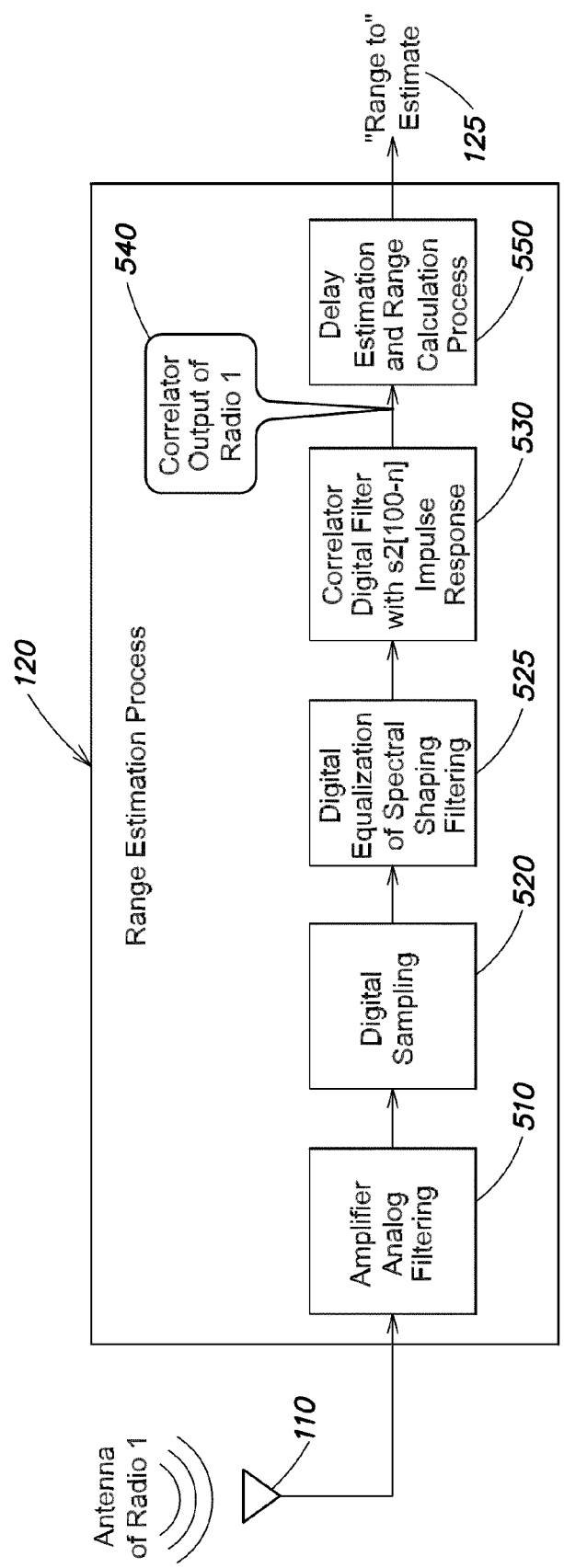
FIG. 5 is a functional block diagram of one example of radio receiver circuitry including a correlator.

Referring to FIG. 4, there is illustrated one example of a received signal 400 defined by equation (2), in which A1=20, A2=15, $d_1$=300 samples, $d_2$=420 samples, and N=1 As shown in FIG. 4, each of the two copies of the signal creates a peak 410, 420 in the received signal. In order to determine the arrival times of the peaks 410, 420 in the received signal, the receiver in radio 1 may employ a receiver correlator. Referring to FIG. 5, there is illustrated a functional block diagram of one example of a receiver correlator 500. Radio 1 receives the received signal 400 with its antenna 110. The received signal may be amplified and filtered by block 510, digitally sampled by block 520 and digitally filtered by block 525 to be equalized or prefiltered. Block 520 may include, for example, an analog-to-digital converter. The correlator 530, which may include a digital filter, acts on the digital signal output from block 520. In one example, if the correlator 530 has an impulse response of s2[100-n], then received signal 400 is processed by the correlator to provide a correlator output signal 540 defined by:

$$\text{rec}1_{jj} = \Sigma(s2_{ii} s1_{\min(ii+jj, \text{rec\_len})}) \quad (3)$$

Figure 6:
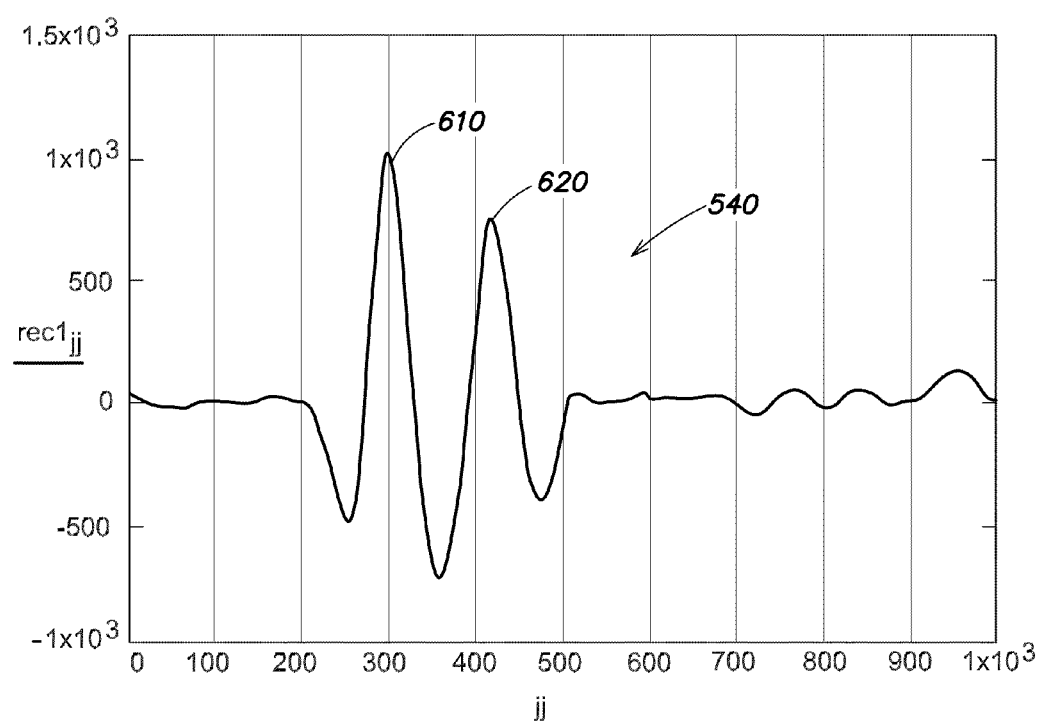
FIG. 6 is a graph illustrating one example of an output signal from the correlator of FIG. 5 corresponding to the received signal of FIG. 4.

An example of the correlator output signal 540 is illustrated in FIG. 6. In the illustrated example, the signal 540 includes two peaks 610, 620 which correspond to the two peaks 410, 420, respectively, present in the received signal 400.

For simplicity, the example signals illustrated and discussed herein are real signals. However, it is to be appreciated that the invention is not so limited and may be implemented using complex signals. Thus, the correlator 530 may be a real or complex correlator, and the signals may be processed in the complex signal (also known as intermediate frequency) domain.

In a conventional system, processing block 550 would look for the maximum in the correlator output signal 540. In the illustrated example, the maximum is peak 610, which corresponds to peak 410 in the received signal. Under these conditions, the receiver of radio 1 may determine that its range from radio 2 is the equivalent of 300 samples (the location of peak 610), despite the presence of the secondary peak 620 caused by the multipath signal. The receiver circuitry may then provide this "range to" estimate 125, along with the range to estimates from each other reference radio being used to the filter 130, as discussed above with reference to FIG. 1.

Figure 7:
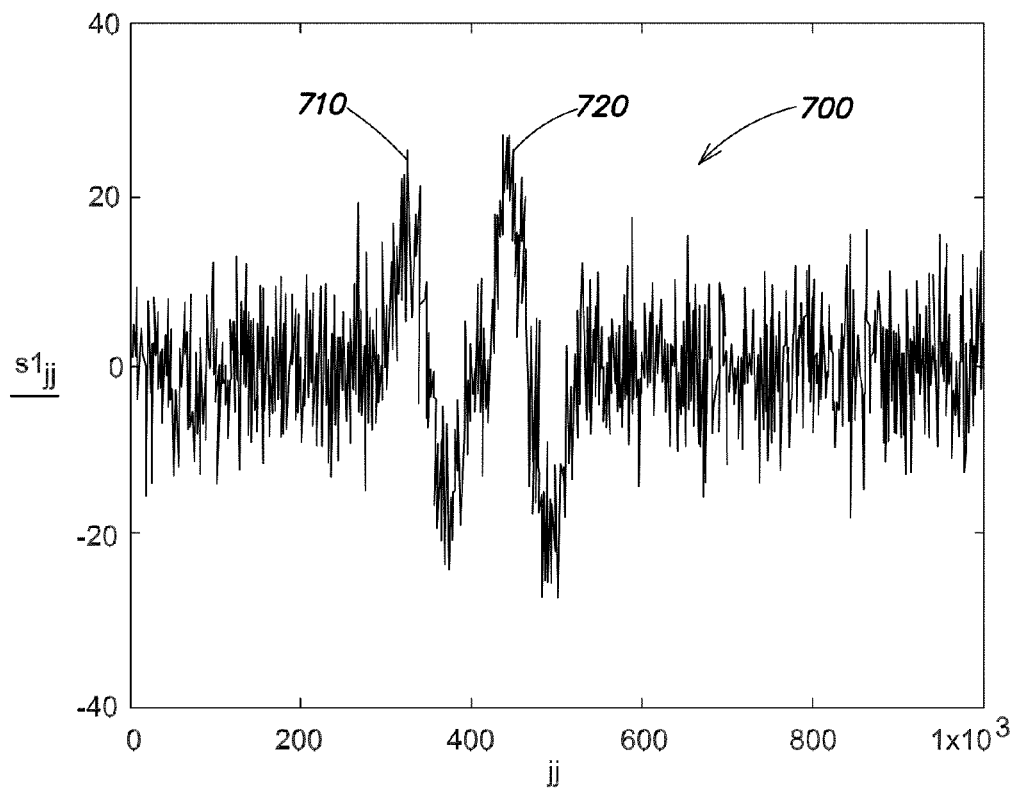
FIG. 7 is a graph illustrating another example of a received signal corresponding to the transmitted signal of FIG. 3 in a multi-path environment.

In many circumstances, the earlier arrival peak (e.g., 410 and 610) in the received signal, which corresponds to the direct path (path 1) in the multipath environment (as illustrated in FIG. 2), will also correspond to the signal with higher amplitude, as in the examples shown in FIGS. 4 and 6. This is typically due to the fact that the secondary path is longer and accordingly represents greater propagation loss. In addition, the reflection of the signal off the barrier 210 is often not perfect and thus also causes signal attenuation. In this case, a conventional method of handling multipath by seeking the highest peak in the received signal may correctly identify the direct-path signal and the range-to estimate may be relatively accurate. However, in other circumstances, conditions in the multipath environment can cause the received amplitude of the direct-path signal to be lower than or obscured by noise relative to that of the signal from the secondary path (path 2). For example, this may occur if there is some obstruction or attenuation in the direct path. Referring to FIG. 7, there is illustrated an example of a received signal 700 received by radio 1 under multipath conditions that cause the signal from the direct path (peak 710) to have a lower amplitude than the signal from the secondary path (peak 720). In the example illustrated in FIG. 7, the received signal 700 is defined by equation (2), in which A1=15, A2=20, $d_1$=300, $d_2$=420, and N=2.

Figure 8:
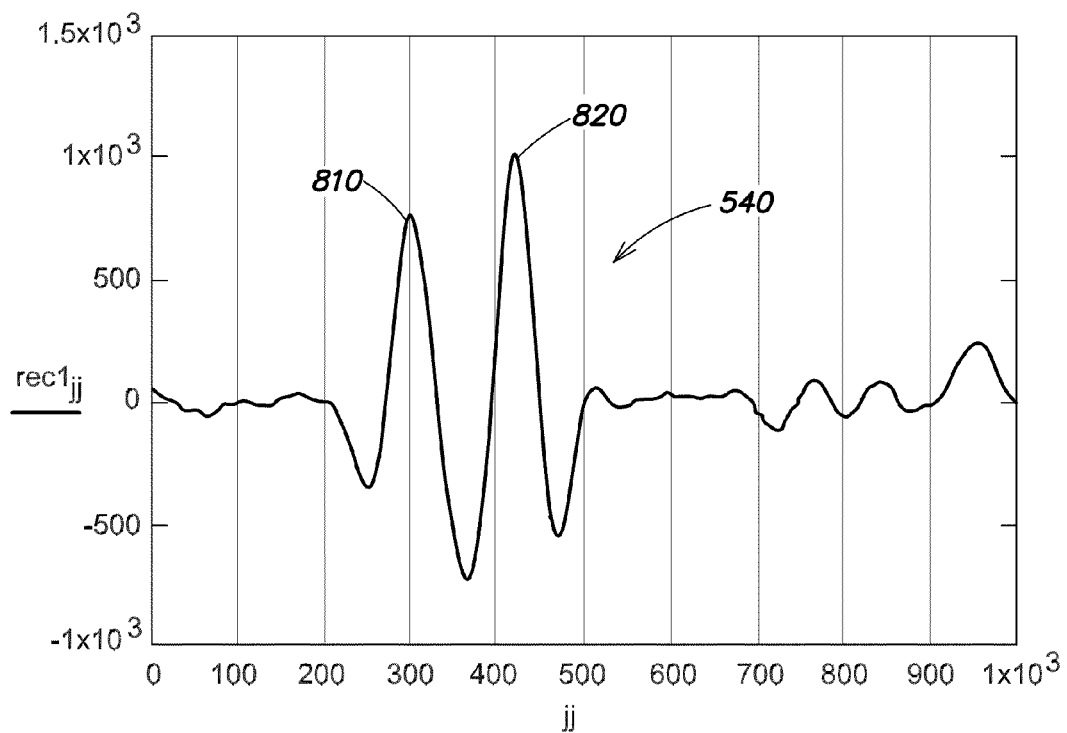
FIG. 8 is a graph illustrating one example of an output signal from the correlator of FIG. 5 corresponding to the received signal of FIG. 7.

Referring to FIG. 8, there is illustrated an example of a correlator output signal 540 corresponding to the received signal 700 illustrated in FIG. 7. As shown, the correlator output signal includes two peaks 810, 820 corresponding to the two peaks 710, 720 in the received signal 700. However, in this example, the peak 820 corresponding to the signal received from the secondary path has higher amplitude than the signal received from the direct path (peak 810). As a result, an implementation seeking the highest amplitude peak in the received signal will lead to an incorrect range estimate. For example, using conventional range estimating processes, the range estimator block 530 may estimate a 420 sample propagation delay (the location of the second, higher peak 820), rather than the actual 300 sample propagation delay (the location of peak 810 corresponding to the direct signal path). This would lead to a significant error in the estimation of the range of the reference radio to radio 1, thereby corrupting the position estimate of radio 1 in the follow-on processing.

According to one embodiment, this problem may be addressed by incorporating into the range estimation processing a feedback process in which prior position estimates may be used to compute time delay boundaries which are fed back into the range estimation process. As discussed above, the time delay between the known time of transmission of a signal by a reference radio and the time of arrival of that signal at the radio may directly translate into a measure of the distance between the radio and the reference radio. Accordingly, knowledge of the rate of movement of the radio and/or reference radio, or maximum expected/possible rates of movement, can be used to set a range within which the distance between the radio and reference radio may vary within the time between successive range-estimation signal transmissions (i.e., between iterations in the range estimation process). This range of variation in distance translates into a range of variation in the measured time delay from one iteration to the next. By setting boundaries on the possible range of time delays, the range-estimation process can be made resistant to multi-path errors, as discussed further below.

Figure 9:
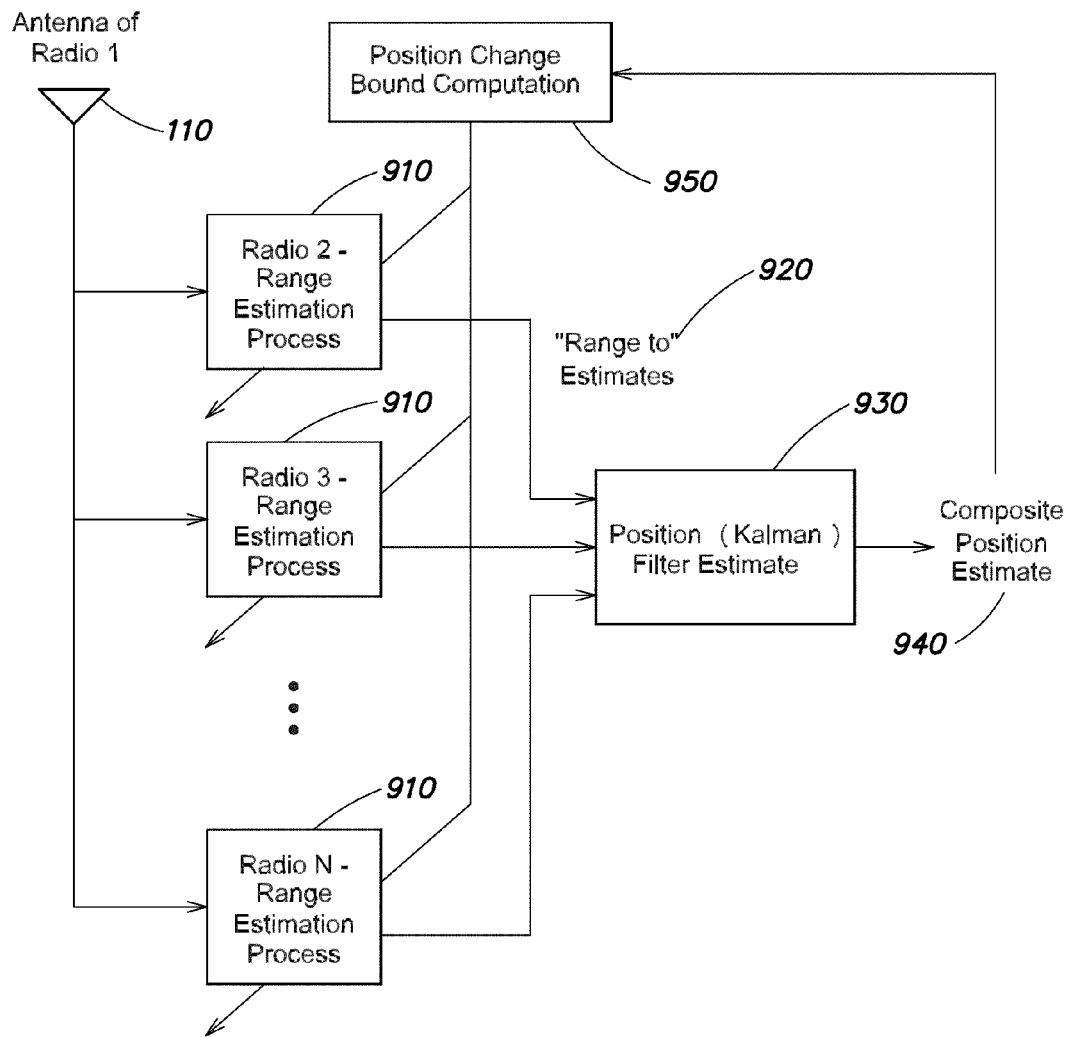
FIG. 9 is a functional block diagram of one example of a position estimation process including feedback, according to aspects of the invention.

Referring to FIG. 9, there is illustrated a functional block diagram of one example of radio receiver circuitry configured for range estimation processing including feedback according to one embodiment. As discussed above, the radio receives the signals from the reference radio(s) with its antenna 110 and computes "range to" estimates 920 to each reference radio being used (process blocks 910). The range to estimates 920 are filtered by the filter block 930 and combined to calculate a composite position of the radio (block 940). This composite position estimate is provided to the feedback block 950 which computes boundaries on the change in position of the radio using predefined information, as discussed below. In one example, the feedback calculation in step 950 seeks to use any change in position of the radio since the previous estimation of position to limit the possible time delay for the signal received from a given reference radio. These limits or boundaries on the time delay for each reference signal are used in the range estimation processes 910 to facilitate making a more accurate range calculation, as discussed further below.

To illustrate an example of this process, suppose that the previous estimate of the position of radio 1 was based on a 300 sample delay for the signal from reference radio 2. In this example, in the next estimate of the position of radio 1, the expected time delay for the signal from radio 2 would be the 300 sample delay previously calculated, plus or minus some change or delta resulting from the mobility of radio 1 and/or radio 2. In particular, the time delay delta should fall within a range defined by any limits of motion of radio 1 and/or radio 2. These limits may be set by, for example, a known maximum relative velocity between the radios and/or a known maximum displacement between the radios. For example, it may be known that radio 1 and/or radio 2 are confined within a certain area and thus, the maximum displacement between the radios may be known to be limited based on the area to which the radio(s) are confined. Similarly, there may be a known maximum communication range between the radios and thus the maximum relative displacement may be known based on the communication limits. Known limits on relative displacement may also be used in combination with known maximum relative velocity to define the time delay boundaries. Any known possible relative motion between the reference and objective radio may be used to define the boundaries on the time delay estimation process. In general, the maximum change in range between the reference radio and the objective radio within a time period between successive estimation iterations is converted into a maximum change in time delay between the radios, thereby defining the boundaries of the time delay estimation.

For example, if the maximum velocities of radio 1 and radio 2 are known, then assuming a known time period between successive position estimates, limits on the change in distance (range) between the two radios can be set. These limits may translate to a minimum time delay delta and a maximum time delay delta. In one example, the minimum time delay delta can be calculated based on the assumption of the two radios moving directly toward one another at maximum velocity, and the maximum time delay delta can be calculated based on the assumption of the two radios moving directly away from one another at maximum velocity. Any other change in the relative position between the two radios, and thus any other time delay delta, will fall within the range set by these two limits.

For example, assume as discussed above that the previous estimate of the position of radio 1 was based on a 300 sample delay for the reference signal from radio 2. If the sample rate is 100 MHz, then the sample period is:

$$T_o = \frac{1 \cdot \sec}{1 \cdot 10^8} = 1 \times 10^{-8} s$$

In this case, assuming the reference signal travels at the speed of light, c, a 300 sample delay ($d_{i-1}$) represents a range between radio 1 and radio 2 ($R_{12i-1}$) of:

$$R_{12i-1} = c \cdot d_{i-1} \cdot T_o = 899.377 \text{ m}$$

If the maximum velocity between radios 1 and 2 is $v_{max}=20$ m/s and the range estimation procedure is performed every 2.5 seconds ($T_{est}=2.5$ s), the boundaries on the time delay estimates for the next range estimate can be established based on the maximum amount of motion during the time period $T_{est}$. Specifically, using the example numbers above, the minimum time delay estimate (in samples) in the next range estimation iteration is:

$$T_{min} = \frac{R_{12i-1} - v_{max} \cdot T_{est}}{c} \cdot T_o = 283.322$$

The maximum time delay estimate (in samples) is similarly calculated as:

$$T_{max} = \frac{R_{12i-1} + v_{max} \cdot T_{est}}{c} \cdot T_o = 316.678$$

Accordingly, the next range estimate between radios A and B can be calculated as:

$$R_{12i} = c \cdot d_i \cdot T_i \text{ in which } T_{min} \leq T_i \leq T_{max}$$

Thus, boundaries on the time delay estimates for each range estimation iteration can be established based the previous time delay estimates and on known conditions, such as the maximum velocity and/or displacement between the radio and the reference radios.

The above example discussed a "pairwise" setting of time delay estimation boundaries, based on a known relative condition (such as maximum relative velocity and/or displacement) between radio 1 and radio 2. This principle can be extended for any number of reference radios to define boundaries based on pairwise restrictions between the objective radio and each reference radio individually. In addition, in examples where more than one reference radio is used, the maximum mobility criterion may be established across the array of reference devices, rather than pairwise with each radio individually. Thus, the boundaries may be "tightened" or further restricted based on knowledge of how the relative mobility between the objective radio and one reference radio affects the relative mobility between the objective radio and another reference radio. For example, considering relative velocity, the time delay estimation boundaries can be restricted further since maximum velocity cannot be achieved in all directions. Thus, if radio 1 is moving toward radio 2 and away from radio 3, then the upper boundary can be tighter or more restrictive in estimating the time delay of the signal sent from radio 2 to radio 1, and the lower boundary can be made tighter for estimating the time delay of the signal sent from radio 3 to radio 1. Similarly, knowledge of various restrictions in mobility across the array of reference radios may be used to narrow the region between the upper and lower boundaries for any or all of the reference signals, thereby further decreasing the risk of incorrectly estimating the time delay for a given reference signal and increasing the robustness of the self-location feature of the objective radio.

Figure 10:
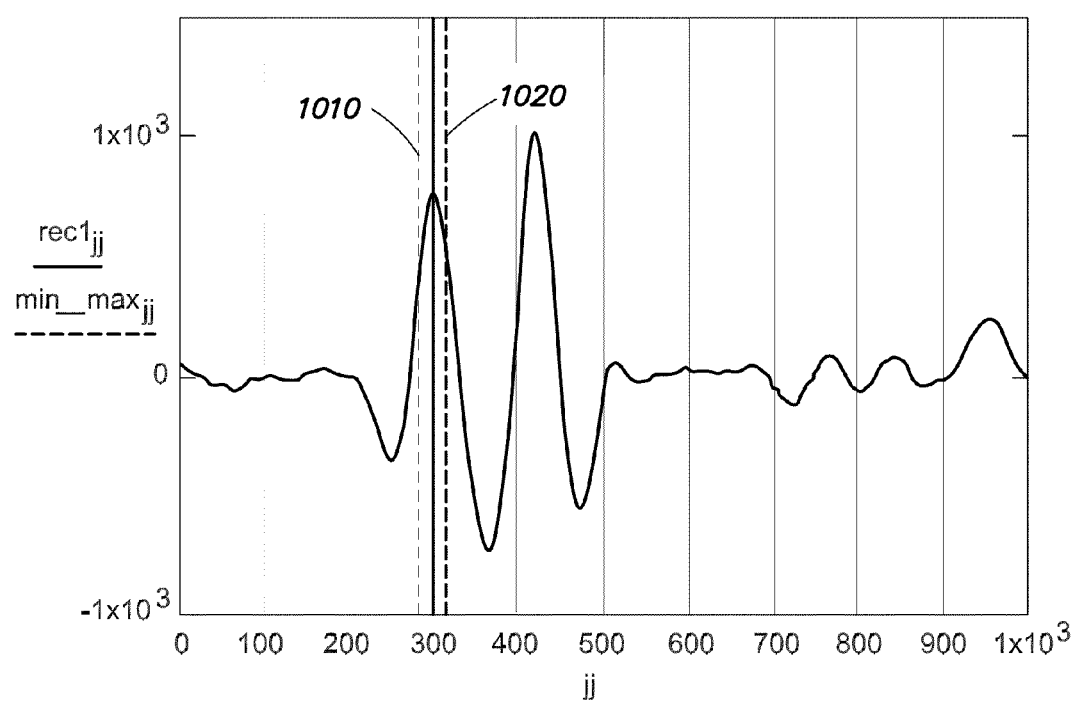
FIG. 10 is a graph illustrating the output signal of FIG. 8 including time delay boundaries according to aspects of the invention.

Referring to FIG. 10, there is illustrated an example of the time delay boundaries, $T_{min}$ and $T_{max}$, calculated above applied to the correlator output signal of FIG. 8. A first boundary line 1010 corresponds to $T_{min}$ and a second boundary line 1020 corresponds to $T_{max}$. The area between the two boundary lines 1010 and 1020 shows the region (in time) to which a search for a signal peak or maximum is limited, based on the known physical constraints on the system, namely, the previous known range estimate and the known maximum possible motion of the radios. As discussed above with reference to FIG. 8, conventional signal processing techniques that simply search for a signal maximum without implementing any time delay boundaries, in a multipath environment can select the wrong signal peak 820, causing errors in the range estimation process. By contrast, according to aspects and embodiments, by limiting the search for a signal maximum to the area defined by the time delay boundaries 1010 and 1020, the multipath signal 820 from the longer path (see FIG. 2, path 2) is excluded, as shown in FIG. 10. Thus, the correlation maximum search may be limited to finding only those direct path (path 1) signals that are physically possible given the known iteration rate of the range estimation process and the known possible motion of the radios. Accordingly, aspects and embodiments may provide a more accurate range estimation technique that is more robust in multipath environments than conventional range estimation processes.

Figure 11:
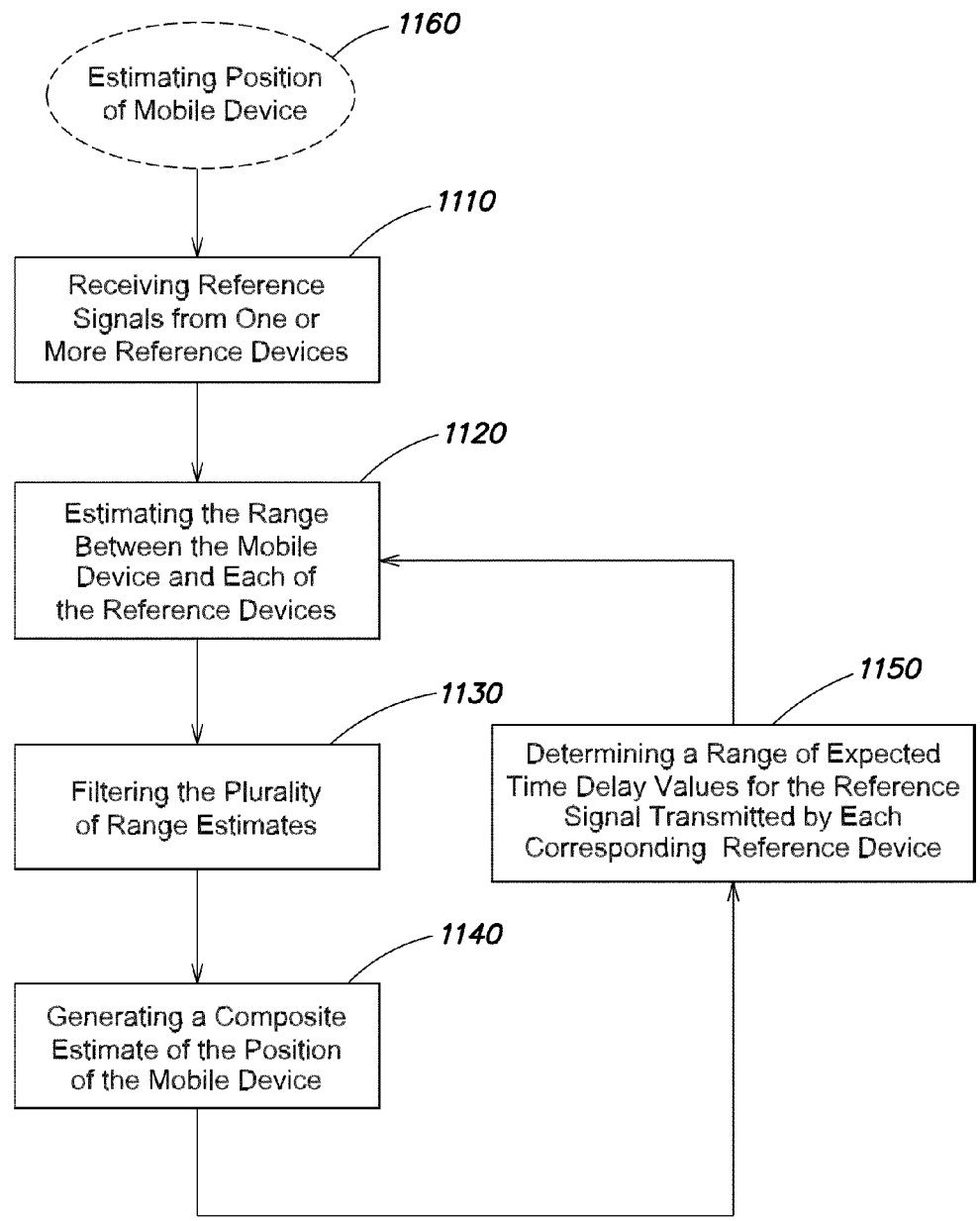
FIG. 11 is a flow diagram illustrating one example of a method of estimating the position of a mobile device according to aspects of the invention.

FIG. 11 illustrates an example of a method of estimating the position of a device, for example, Radio 1, using aspects of the techniques discussed above. According to one embodiment, the method includes a step 1110 of receiving one or more reference signals from corresponding reference devices. For example, in the example shown in FIG. 1, Radio 1 receives reference signals from Radios 2, 3 through N. For each received reference signal, the method may include a step 1120 of estimating the range between the device (e.g., Radio 1) and the corresponding reference device that transmitted the reference signal, as indicated by block 910 in FIG. 9. Estimating the range between the device and each reference device can include using a time delay estimation process, as discussed above. Thus, step 1120 may include generating a plurality of "range to" estimates, as shown in FIG. 9. The method may then include a step 1130 of filtering the plurality of "range to" estimates (block 930 in FIG. 9) and, based on this filtering, generating a composite estimate of the position of the device (step 1140). As discussed above, based on known mobility of the device (e.g., Radio 1) and the reference devices, such as a maximum velocity between Radio 1 and each of the reference devices being used, boundaries on the time delay estimates for each range estimation iteration can be established. Thus, the method may include a step 1150 of computing time delay boundaries and thereby determining a range of expected time delay values for the reference signal transmitted by each corresponding reference device.

As illustrated in FIG. 11, the ranges of expected time delay values for each reference signal may be fed back into the range estimation step 1120. Thus, step 1120 may include, for each reference signal, estimating a range between the device and the corresponding reference device based on a measured time delay of the reference signal falling within the range of expected time delay values, to produce the plurality of "range to" estimates. As discussed above, this step 1120 may include analyzing the signals to find a signal peak within the expected range. The process may be repeated iteratively, as discussed above. It will also be appreciated that the first time the method is implemented in a given setting, where no previous "range to" estimates exist, the method may include an initial step 1160 of estimating the position of the device, or the range to one or more selected reference devices, and that this initial estimate may be used in the first iteration of the method.

Having thus described several aspects of at least one embodiment, it is to be appreciated various alterations, modifications, and improvements will readily occur to those skilled in the art. For example, the above-discussed examples show the time delay boundaries and calculations in terms of samples; however, it will be readily apparent to those skilled in the art that the techniques may be implemented using other units. In addition, those skilled in the art will appreciate that there are many variations on the methods of time delay estimation discussed above to account for complex signal representations, non-Gaussian noise, or unknown phase of the received signal. The techniques and processes discussed herein may be applied to all different methods and different signal types because only the function of computing an estimate of the signal's time of propagation is needed. As will be recognized by those skilled in the art, estimating the time delay of the arrival of a replica of the known sent signal, and selecting the maximum of a received filtered signal may be performed on any signal, provided appropriate signal processing is implemented. Furthermore, although the above-discussed examples refer to range estimation of radios, the invention is not so limited, and the range estimation processes may be applied to any type of wireless mobile device, including, but not limited to, mobile telephones, radios, personal digital devices, computers, sensors, identification tags, etc. Accordingly, such alterations, modifications, and improvements are intended to be part of this disclosure and are intended to be within the scope of the invention. Therefore, the foregoing description and drawings are by way of example only, and the scope of the invention should be determined from proper construction of the appended claims, and their equivalents.

What is claimed is:
1. A method of estimating a position of a device, the method comprising:
  receiving a reference signal at the device transmitted from a reference device;
  determining a range of values for a time delay of the reference signal based on a known relative mobility of the device and the reference device;
  analyzing the reference signal to detect a peak of the reference signal;
  estimating the time delay of the reference signal by determining from the detected peak of the reference signal a delay falling within the range of values for the time delay; and
  based on the estimated time delay, estimating a distance between the device and the reference device.

2. The method as claimed in claim 1, wherein determining the range of values for the time delay includes calculating the range of values for the time delay based on a known maximum velocity of at least one of the device and the reference device.

3. The method as claimed in claim 1, further comprising receiving at least one additional reference signal from a corresponding at least one additional reference device; and, for each additional reference signal:
- determining an expected range of time delay values;
- estimating a time delay by analyzing the additional reference signal to detect a delay of the additional reference signal falling with the expected range of time delay values; and
- based on the estimated time delay, estimating a distance between the device and the corresponding additional reference device.

4. The method as claimed in claim 3, further comprising filtering each of the estimated distances to produce a composite estimate of the position of the device.

5. The method as claimed in claim 1, wherein determining the range of values of the time delay includes determining the range of values of the time delay based on a prior known position of the device and the known relative mobility of the device and reference device.

6. The method as claimed in claim 1, wherein determining the range of values of the time delay includes determining the range of values of the time delay based on a known maximum relative displacement between the device and the reference device.

7. A method of estimating a position of a device, the method comprising:
- receiving a plurality of reference signals from a corresponding plurality of reference devices;
- for each reference signal, determining a range of expected time delay values for the reference signal transmitted by the corresponding reference device;
- for each reference signal, estimating a range between the device and the corresponding reference device based on a measured time delay of the reference signal falling within the range of expected time delay values to produce a plurality of range estimates; and
- filtering the plurality of range estimates to generate a composite estimate of the position of the device.

8. The method as claimed in claim 7, wherein determining the range of expected time delay values includes determining the range of expected time delay values based on a known relative mobility between the device and the corresponding reference device.

9. The method as claimed in claim 8, wherein determining the range of expected time delay values includes determining the range of expected time delay values based on a known maximum velocity of the device relative to the corresponding reference device and a known time period between successive transmissions of the reference signal from the corresponding reference device.

10. The method as claimed in claim 8, wherein determining the range of expected time delay values includes determining the range of expected time delay values based on a known maximum displacement of the device relative to the corresponding reference device and a known time period between successive transmissions of the reference signal from the corresponding reference device.

11. The method as claimed in claim 7, wherein determining the range of expected time delay values includes determining the range of expected time delay values based on a known relative mobility between the device and at least one of the plurality of reference devices.

12. The method as claimed in claim 7, wherein determining the range of expected time delay values includes determining a minimum expected time delay value and a maximum expected time delay value.

13. The method as claimed in claim 7, further comprising iteratively repeating the method to produce updated composite estimates of the position of the device after each time period between successive transmissions of the reference signals by the corresponding plurality of reference devices.

14. The method as claimed in claim 7, wherein estimating a range between the device and the corresponding reference device includes analyzing the reference signal to detect a peak of the reference signal falling within the range of expected time delay values.

15. A position estimation apparatus for a mobile device comprising:
- an antenna to receive a plurality of reference signals, each reference signal of the plurality of reference signals being transmitted to the mobile device from one of a corresponding plurality of reference devices;
- a range estimation device coupled to the antenna to receive the plurality of reference signals and to estimate a range between the mobile device and each of the corresponding reference devices based on a measured time delay of each of the plurality of reference signals to produce a plurality of range estimates;
- a filter coupled to the range estimation circuitry and configured to receive and filter the plurality of range estimates and to generate a composite estimate of the position of the device; and
- a feedback device coupled to the filter and to the range estimation circuitry and configured to receive the composite estimate of the position of the device and to calculate a range of expected time delay values for each reference signal;
- wherein the range estimation circuitry is further configured to receive the range of expected time delay values for each reference signal from the feedback device and to estimate the range between the device and the corresponding reference device based on a measured time delay of the reference signal falling within the corresponding range of expected time delay values calculated by the feedback device.

16. The position estimation apparatus as claimed in claim 15, wherein the mobile device is a radio.

17. The position estimation apparatus as claimed in claim 15, further comprising:
- signal processing apparatus coupled to the antenna that receives and processes the plurality of reference signals and to produce a corresponding plurality of processed signals;
- wherein the range estimation device is coupled to the signal processing apparatus and receives the plurality of processed signals from the signal processing apparatus;
- wherein the signal processing circuitry comprises:
  - a digital sampler configured to receive and digitally sample the plurality of reference signals to produce a corresponding plurality of digital signals; and
  - a correlator coupled to the digital sampler and configured to receive and filter the plurality of digital signals to produce the plurality of processed signals.

18. The position estimation apparatus as claimed in claim 17, wherein the digital sampler comprises an analog-to-digital converter.

19. The position estimation apparatus as claimed in claim 17, wherein the position estimation apparatus is configured to analyze the reference signals in the complex signal domain; and wherein the digital sample comprises a plurality of complex correlators.

20. The position estimation apparatus as claimed in claim 17, wherein the correlator comprises a complex digital filter.

21. The position estimation apparatus as claimed in claim 17, wherein the range estimation device is further configured to analyze the plurality of processed signals and, for each processed signal, to detect a peak of the processed signal and based on the detected peak, calculate a time delay of the processed signal falling within the corresponding range of expected time delay values calculated by the feedback device.

22. The position estimation apparatus as claimed in claim 15, wherein the feedback device is configured to calculate the range of expected time delay values based on a known time period between successive transmissions of the plurality of reference signals by the corresponding plurality of reference devices, and a known mobility of the device relative to at least one of the plurality of reference devices during the time period.

* * * * *